(12) United States Patent
Zhang et al.

(10) Patent No.: US 12,429,410 B2
(45) Date of Patent: Sep. 30, 2025

(54) METHOD FOR DETERMINING OIL AND GAS RELATIVE PERMEABILITIES OF RESERVOIR

(71) Applicant: CHINA UNIVERSITY OF PETROLEUM (EAST CHINA), Qingdao (CN)

(72) Inventors: Jiyuan Zhang, Qingdao (CN); Kuankuan Wu, Qingdao (CN); Qihong Feng, Qingdao (CN); Sen Wang, Qingdao (CN); Xianmin Zhang, Qingdao (CN); Wendong Wang, Qingdao (CN); Yong Qin, Qingdao (CN); Huajun Du, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 301 days.

(21) Appl. No.: 18/143,601

(22) Filed: May 4, 2023

(65) Prior Publication Data
US 2024/0159643 A1 May 16, 2024

(30) Foreign Application Priority Data
Nov. 11, 2022 (CN) .......................... 202211415985.5

(51) Int. Cl.
*G01N 15/08* (2006.01)
(52) U.S. Cl.
CPC ................................ *G01N 15/0826* (2013.01)

(58) Field of Classification Search
CPC ..... G01N 15/00; G01N 15/08; G01N 15/0826
See application file for complete search history.

(56) References Cited

U.S. PATENT DOCUMENTS

| | | | | |
|---|---|---|---|---|
| 4,486,714 A | * | 12/1984 | Davis, Jr. | ............... G01N 22/04 73/152.09 |
| 2006/0047432 A1 | * | 3/2006 | Egermann | ............ G01N 15/082 702/12 |

* cited by examiner

*Primary Examiner* — Nguyen Q. Ha
(74) *Attorney, Agent, or Firm* — Richard A. Castellano; CASTELLANO (57) ABSTRACT

The present disclosure relates to a method for determining oil and gas relative permeabilities of a reservoir. The method includes: drilling a cylindrical core from a to-be-tested reservoir; injecting an oil and gas mixture into the cylindrical core through the piston container at a set flow rate by using the relative permeability testing device, and reducing pressures at a control end of the back pressure valve in sequence to obtain experimental values acquired under each pressure at the control end of the back pressure valve; equivalently simulating developing performance of a producing well of the to-be-tested reservoir using a one-dimensional numerical simulation grid model based on current oil and gas phase relative permeability curves, so as to obtain simulation values at different times; constructing an objective function according to the experimental and simulation values; determining whether a value of the objective function reaches a preset target value.

8 Claims, 3 Drawing Sheets

METHOD FOR DETERMINING OIL AND GAS RELATIVE PERMEABILITIES OF RESERVOIR

CROSS REFERENCE TO RELATED APPLICATION

This patent application claims the benefit of and priority to Chinese Patent Application No. 202211415985.5, filed with the China National Intellectual Property Administration on Nov. 11, 2022, the disclosure of which is incorporated by reference herein in its entirety as part of the present application.

TECHNICAL FIELD

The present disclosure relates to the technical field of oil and gas development, and in particular, to a method for determining oil and gas relative permeabilities of a reservoir.

BACKGROUND

Low-permeability, tight and shale oil and gas are important unconventional oil and gas resources in China, and their efficient development is of strategic significance to ensure China's oil and gas energy supply. As an important basic parameter affecting the development of low-permeability and tight oil and gas, the oil and gas relative permeability needs to be measured accurately.

At present, the indoor experimental methods for measuring the oil and gas relative permeability mainly include the steady-state method and the unsteady-state method. The steady-state method is mainly used for medium and high permeability reservoirs. For low-permeability or tight reservoirs, the steady-state method usually has the problem that it is difficult to inject two-phase fluid simultaneously, and the test cycle is long. Compared with the steady-state method, the experimental process of the unsteady-state method is relatively simple and can greatly reduce the test time. However, for low-permeability or tight reservoirs, the unsteady-state method generally requires a large displacement pressure gradient to make the two-phase fluid flow together. The pressure gradient is usually significantly higher than that in the actual reservoir, which leads to a large difference between the measured relative permeability and the actual permeability. In addition, the unsteady-state method usually calculates the oil and gas relative permeability based on the Johnson-Bossler-Naumann (JBN) method, which does not consider the strong compressibility of gas, the mass transfer between oil and gas phases and the change of fluid physical properties. Therefore, the calculated oil and gas relative permeability is usually very different from the actual value.

SUMMARY

An objective of the present disclosure is to provide a method for determining oil and gas relative permeabilities of a reservoir, which improves the accuracy of determining the oil and gas relative permeability.

To achieve the above objective, the present disclosure provides the following technical solutions:

A method for determining oil and gas relative permeabilities of a reservoir is provided, using a relative permeability testing device. The relative permeability testing device includes a piston container, a valve, a first pressure gauge, a core holder, a second pressure gauge, a back pressure valve and a back pressure pump that are connected in sequence. The relative permeability testing device further includes a confining pressure pump, an oil and gas separator, a gas flowmeter and a balance. The confining pressure pump is configured to provide a confining pressure for the core holder, the oil and gas separator is connected with the back pressure valve, and both the gas flowmeter and the balance are connected with the oil and gas separator.

The method for determining oil and gas relative permeabilities of a reservoir includes:
  drilling a cylindrical core from a to-be-tested reservoir;
  injecting an oil and gas mixture with a volume ratio of oil to gas of 1 into the cylindrical core through the piston container at a set flow rate by using the relative permeability testing device, and reducing pressures at a control end of the back pressure valve in sequence to obtain experimental values acquired under each pressure at the control end of the back pressure valve at a set time interval, where the experimental values include an upstream pressure, a downstream pressure, a cumulative gas production experimental value and a cumulative oil production experimental value; the upstream pressure represents a pressure of the first pressure gauge, the downstream pressure represents a pressure of the second pressure gauge, the cumulative gas production experimental value is obtained by the gas flowmeter, and the cumulative oil production experimental value is obtained by the balance; and the oil and gas mixture is a mixture of to-be-tested gas and to-be-tested crude oil;
  constructing a one-dimensional numerical simulation grid model according to the cylindrical core; and initializing an oil phase relative permeability curve and a gas phase relative permeability curve of the one-dimensional numerical simulation grid model;
  equivalently simulating developing performance of a producing well of the to-be-tested reservoir using the one-dimensional numerical simulation grid model based on a current oil phase relative permeability curve and a current gas phase relative permeability curve, so as to obtain simulation values at different times, where the simulation values include an upstream pressure simulation value, a cumulative gas production simulation value and a cumulative oil production simulation value;
  constructing an objective function according to the experimental and simulation values;
  determining whether a value of the objective function is less than or equal to a preset target value;
  if not, adjusting the oil phase relative permeability curve and the gas phase relative permeability curve of the one-dimensional numerical simulation grid model, and returning to the step of "equivalently simulating developing performance of a producing well of the to-be-tested reservoir using the one-dimensional numerical simulation grid model based on a current oil phase relative permeability curve and a current gas phase relative permeability curve, so as to obtain simulation values at different times"; and
  if yes, outputting the current oil phase relative permeability curve and the current gas phase relative permeability curve.

Optionally, a process of injecting an oil and gas mixture with a volume ratio of oil to gas of 1 into the cylindrical core through the piston container at a set flow rate by using the relative permeability testing device, and reducing pressures at a control end of the back pressure valve in sequence to obtain experimental values acquired under each pressure at the control end of the back pressure valve at a set time interval specifically includes:

loading the cylindrical core into the core holder, injecting the oil and gas mixture with a volume ratio of oil to gas of 1 into the cylindrical core through the piston container at the set flow rate, closing the valve when an oil and gas output speed of the core holder changes within a set change range within a set time period, and closing the back pressure valve when a difference between the first pressure gauge and the second pressure gauge is less than a set pressure value;

initializing the pressure at the control end of the back pressure valve to 0.9×P, where P is a formation pressure of the to-be-tested reservoir;

opening the back pressure valve, recording the upstream pressure, the downstream pressure, the cumulative gas production experimental value and the cumulative oil production experimental value according to a set frequency, and closing the back pressure valve until the oil and gas separator no longer produces gas;

subtracting a set control pressure from a current pressure at the control end of the back pressure valve to obtain an updated pressure at the control end of the back pressure valve;

determining whether the updated pressure at the control end of the back pressure valve is less than a set minimum control pressure; and if not, returning to the step of "opening the back pressure valve, recording the upstream pressure, the downstream pressure, the cumulative gas production experimental value and the cumulative oil production experimental value according to a set frequency, and closing the back pressure valve until the oil and gas separator no longer produces gas".

Optionally, the pressures at the control end of the back pressure valve reduced in sequence specifically include 0.8×P, 0.7×P, 0.6×P, 0.5×P, 0.4×P, 0.3×P, 0.2×P and 0.1×P.

Optionally, a process of constructing a one-dimensional numerical simulation grid model according to the cylindrical core, and initializing an oil phase relative permeability curve and a gas phase relative permeability curve of the one-dimensional numerical simulation grid model specifically includes:

determining a number of grids on an x-axis of the one-dimensional numerical simulation grid model according to a length of the cylindrical core, where a number of grids on a y-axis and a z-axis of the one-dimensional numerical simulation grid model is 1; and the grid on the x-axis is expressed as nx=L/dx+2, where L represents the length of the cylindrical core, dx is a length of each grid in an x-axis direction, and dx is not greater than 1 cm;

determining a length of a grid of the one-dimensional numerical simulation grid model in a y-axis direction and a z-axis direction according to a diameter of the cylindrical core, where $dy=dz=\sqrt{0.25\pi D^2}$, dy is a length of each grid in the y-axis direction, dz is a length of each grid in the z-axis direction, and D is the diameter of the cylindrical core;

taking a temperature of the to-be-tested reservoir as a simulated ambient temperature of the one-dimensional numerical simulation grid model;

taking the formation pressure of the to-be-tested reservoir as an initial simulated environmental pressure of the one-dimensional numerical simulation grid model;

placing the cylindrical core in an overburden pressure pore permeability instrument to measure a porosity and gas permeability under different pore pressure conditions, where an experimental temperature of the overburden pressure pore permeability instrument is set to the temperature of the to-be-tested reservoir, and an experimental confining pressure of the overburden pressure pore permeability instrument is set to be higher than the formation pressure of the to-be-tested reservoir;

taking the porosity and gas permeability measured in the overburden pressure pore permeability instrument under different pore pressure conditions as a porosity and gas permeability of central grids of the one-dimensional numerical simulation grid model, where the central grids are other grids after removing one grid at both ends of the one-dimensional numerical simulation grid model in the x-axis direction;

for the central grids: setting an initialized first oil phase relative permeability curve and first gas phase relative permeability curve as straight lines, and taking oil saturation as an abscissa and an oil phase relative permeability and a gas phase relative permeability as ordinates, where the first oil phase relative permeability curve crosses ($S_{or}$, 0) and (1,1), the first gas phase relative permeability curve crosses ($S_{or}$, 1) and (1, 0), and a calculation method of $S_{or}$ is $$sor = 1 - \frac{V_{po}}{0.25\pi D^2 L \emptyset_0},$$

where $V_{po}$ is the cumulative oil production experimental value, and $\emptyset_0$ is a porosity when the pore pressure measured in the overburden pressure pore permeability instrument is the formation pressure of the to-be-tested reservoir;

for a first endpoint grid and a second endpoint grid: taking V1/(dx·dy·dz) as a porosity of the first endpoint grid and V2/(dx·dy·dz) as a porosity of the second endpoint grid, where the first endpoint grid is a grid at a left end of the one-dimensional numerical simulation grid model in the x-axis direction, the second endpoint grid is a grid at a right end of the one-dimensional numerical simulation grid model in the x-axis direction, V1 represents a void volume between the valve and a left end face of the cylindrical core, V2 represents a void volume between the back pressure valve and a right end face of the cylindrical core, an initialized second oil phase relative permeability curve and second gas phase relative permeability curve are set as straight lines, and oil saturation is taken as an abscissa and an oil phase relative permeability and a gas phase relative permeability are taken as ordinates, where the second oil phase relative permeability curve crosses (0, 0) and (1,1), and the second gas phase relative permeability curve crosses (0, 1) and (1, 0); and setting a simulation well in the second endpoint grid, where a wellbore diameter of the simulation well is the same as an inner diameter of a tubing on a left side of the back pressure valve, and the left side of the back pressure valve is a side of the back pressure valve connected with the second pressure gauge.

Optionally, the objective function is expressed as:

$$f = \frac{1}{3}\left[\frac{\sum_{i=1}^{N}(C_{gs}^i - C_{ge}^i)^2}{\sum_{i=1}^{N}(C_{ge}^i - C_{ge}^{avg})^2} + \frac{\sum_{i=1}^{N}(C_{os}^i - C_{oe}^i)^2}{\sum_{i=1}^{N}(C_{oe}^i - C_{oe}^{avg})^2} + \frac{\sum_{i=1}^{N}(P_{Gs}^i - P_{Ge}^i)^2}{\sum_{i=1}^{N}(P_{Ge}^i - P_{Ge}^{avg})^2}\right],$$

where $f$ represents the value of the objective function, N represents a number of simulation values, $C_{gs}^i$ represents an i-th cumulative gas production simulation value, $C_{ge}^i$ represents an i-th cumulative gas production experimental value, $C_{ge}^{avg}$ represents an average of N-th cumulative gas production experimental values, $C_{os}^i$ represents an i-th cumulative oil production simulation value, $C_{oe}^i$ represents an i-th cumulative oil production experimental value, $C_{oe}^{avg}$ represents an average of N-th cumulative oil production experimental values, $P_{Gs}^i$ represents a pressure of an i-th first pressure gauge, and $P_{Ge}^i$ represents a pressure of an i-th first endpoint grid.

Optionally, a process of equivalently simulating developing performance of a producing well of the to-be-tested reservoir using the one-dimensional numerical simulation grid model based on a current oil phase relative permeability curve and a current gas phase relative permeability curve, so as to obtain simulation values at different times, where the simulation values include an upstream pressure simulation value, a cumulative gas production simulation value and a cumulative oil production simulation value specifically includes:

equivalently simulating the developing performance of the producing well of the to-be-tested reservoir using a component numerical simulator, so as to obtain the simulation values at different times.

Optionally, the component numerical simulator includes GEM numerical simulation software and Eclipse E300 numerical simulation software.

Optionally, a length of the cylindrical core is greater than or equal to 1.5 times a diameter of the cylindrical core.

Optionally, the relative permeability testing device further includes a constant pressure and constant speed pump connected to one end of the piston container, and the other end of the piston container is connected to the valve.

According to the specific embodiments provided by the present disclosure, the present disclosure provides the following technical effects:

The present disclosure carries out the experimental testing through the relative permeability testing device to obtain the experimental values, carries out the equivalent simulation of the experimental testing through the one-dimensional numerical simulation grid model to obtain the simulation values, and constructs the objective function through the experimental values and the simulation values, thus determining the oil phase relative permeability curve and gas phase relative permeability curve of the to-be-tested reservoir, which can overcome the defects of the prior art that the large displacement pressure difference is relied on and there is a large error in the interpretation result, and can improve the difficulty and accuracy of testing the oil and gas relative permeability of low-permeability or tight reservoirs.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a method for determining oil and gas relative permeabilities of a reservoir, which improves the accuracy of determining the oil and gas relative permeability.

To make the above objectives, features, and advantages of the present disclosure clearer and more comprehensible, the present disclosure will be further described in detail below with reference to the accompanying drawings and the specific embodiments.

Figure 1:
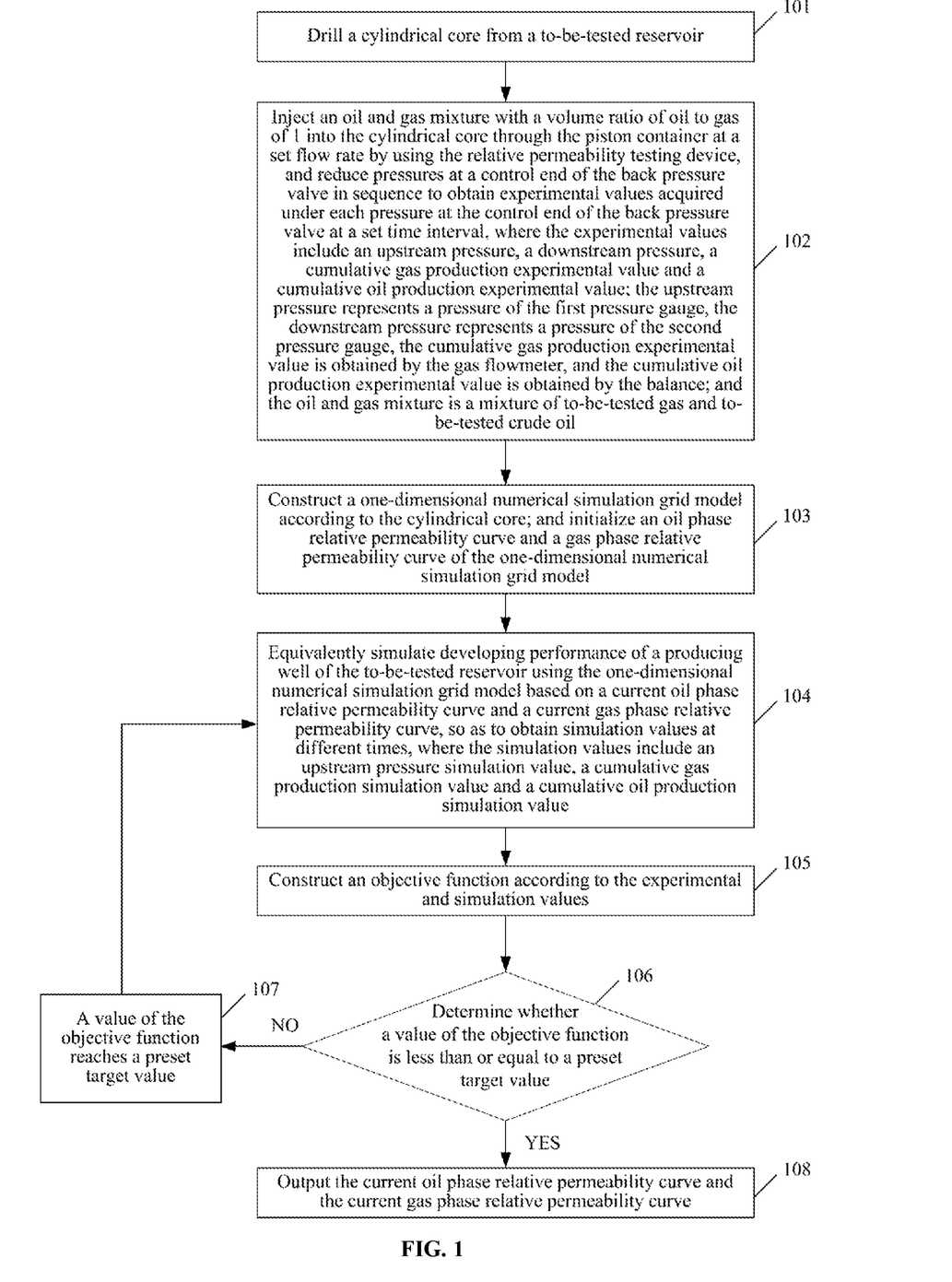
FIG. 1 is a flow diagram of a method for determining oil and gas relative permeabilities of a reservoir of the present disclosure.
Figure 2:
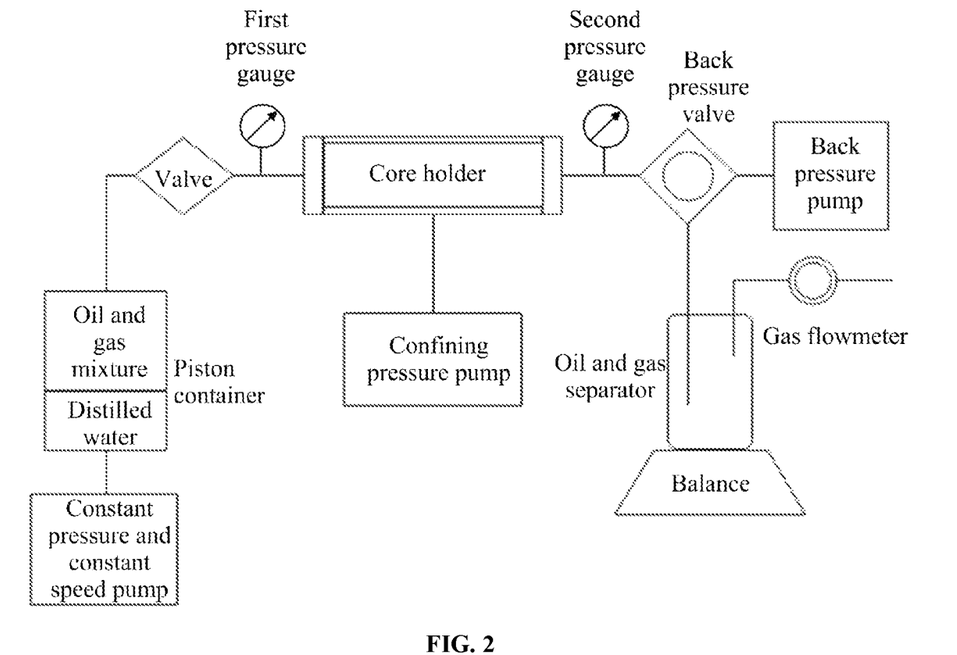
FIG. 2 is a schematic structural diagram of a relative permeability testing device of the present disclosure.

FIG. 1 is a flow diagram of a method for determining oil and gas relative permeabilities of a reservoir of the present disclosure. As shown in FIG. 1, the method for determining oil and gas relative permeabilities of a reservoir is provided, using a relative permeability testing device. As shown in FIG. 2, the relative permeability testing device includes a piston container, a valve, a first pressure gauge, a core holder, a second pressure gauge, a back pressure valve and a back pressure pump that are connected in sequence. The relative permeability testing device further includes a confining pressure pump, an oil and gas separator, a gas flowmeter and a balance. The confining pressure pump is configured to provide a confining pressure for the core holder, the oil and gas separator is connected with the back pressure valve, and both the gas flowmeter and the balance are connected with the oil and gas separator.

The relative permeability testing device further includes a constant pressure and constant speed pump connected to one end of the piston container, and the other end of the piston container is connected to the valve.

The method for determining oil and gas relative permeabilities of a reservoir includes the following steps.

Step 101: A cylindrical core is drilled from a to-be-tested reservoir.

A length of the cylindrical core is greater than or equal to 1.5 times a diameter of the cylindrical core.

Step 101 further includes cleaning and drying the cylindrical core, and measuring a length L and a diameter D.

Step 102: An oil and gas mixture with a volume ratio of oil to gas of 1 is injected into the cylindrical core in the core holder through the piston container at a set flow rate by using the relative permeability testing device, and pressures at a control end of the back pressure valve are reduced in sequence to obtain experimental values acquired under each pressure at the control end of the back pressure valve at a set time interval. The experimental values include an upstream pressure, a downstream pressure, a cumulative gas production experimental value and a cumulative oil production experimental value. The upstream pressure represents a pressure of the first pressure gauge, the downstream pressure represents a pressure of the second pressure gauge, the cumulative gas production experimental value is obtained by the gas flowmeter, and the cumulative oil production experimental value is obtained by the balance. The oil and gas mixture is a mixture of to-be-tested gas and to-be-tested crude oil. The cumulative gas production experimental value can also be measured by a gas drainage device. The cumulative oil and gas production is accumulated over time and recorded until when no more oil and gas are produced under the control of each pressure at the control end of the back pressure valve.

Step 102 specifically includes the following sub-steps.

Figure 3:
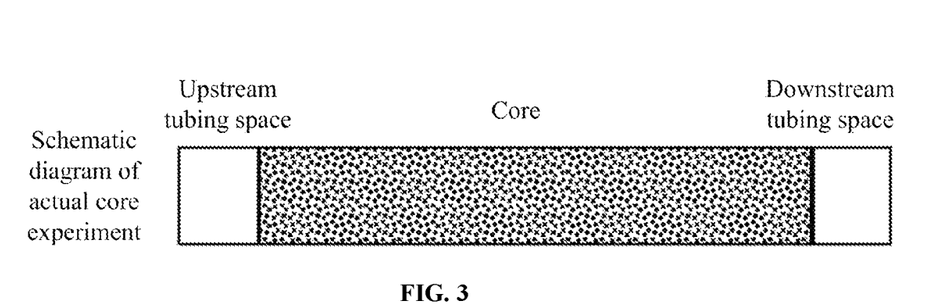
FIG. 3 is a schematic structural diagram of a cylindrical core in the relative permeability testing device of the present disclosure.

The cylindrical core is loaded into the core holder. As shown in FIG. 3, the control pressure of the back pressure valve is set as P, the experimental temperature is set as T, and the confining pressure is higher than the formation pressure of the to-be-tested reservoir. The oil and gas mixture with a volume ratio of oil to gas of 1 is injected into the piston container and injected into the cylindrical core via the valve at a set flow rate after the pressure of the piston container is stable. The valve is closed when an oil and gas output speed from the core holder through the back pressure valve is steady within a set change range within a set time period. The back pressure valve is initialized by the back pressure pump to 0.9×P, where P is a formation pressure of the to-be-tested reservoir. The back pressure valve is closed when readings of the first pressure gauge and the second pressure gauge are equal or a difference between the readings is less than a set pressure value. The set pressure is 0.001 MPa.

As mentioned, the pressure at the control end of the back pressure valve is initialized to 0.9×P. P is a formation pressure of the to-be-tested reservoir.

The back pressure valve is then opened to reduce the back pressure in sequence, the upstream pressure, the downstream pressure, the cumulative gas production experimental value and the cumulative oil production experimental value are recorded according to a set frequency, the set frequency is not less than 2 times/min. The back pressure valve is then closed again when the oil and gas separator no longer produces gas.

A set control (back) pressure is reduced from a current pressure at the control end of the back pressure valve to obtain an updated pressure at the control end of the back pressure valve.

Whether the updated pressure at the control end of the back pressure valve is less than a set minimum control pressure (0.1×P) is determined.

If not, the method returns to the step of "opening the back pressure valve, recording the upstream pressure, the downstream pressure, the cumulative gas production experimental value and the cumulative oil production experimental value according to a set frequency, and closing the back pressure valve when the oil and gas separator no longer produces gas".

The pressures at the control end of the back pressure valve reduced in sequence specifically include 0.8×P, 0.7×P, 0.6×P, 0.5×P, 0.4×P, 0.3×P, 0.2×P and 0.1×P.

Step 103: A one-dimensional numerical simulation grid model is constructed according to the cylindrical core. An oil phase relative permeability curve and a gas phase relative permeability curve of the one-dimensional numerical simulation grid model are initialized.

Figure 4:
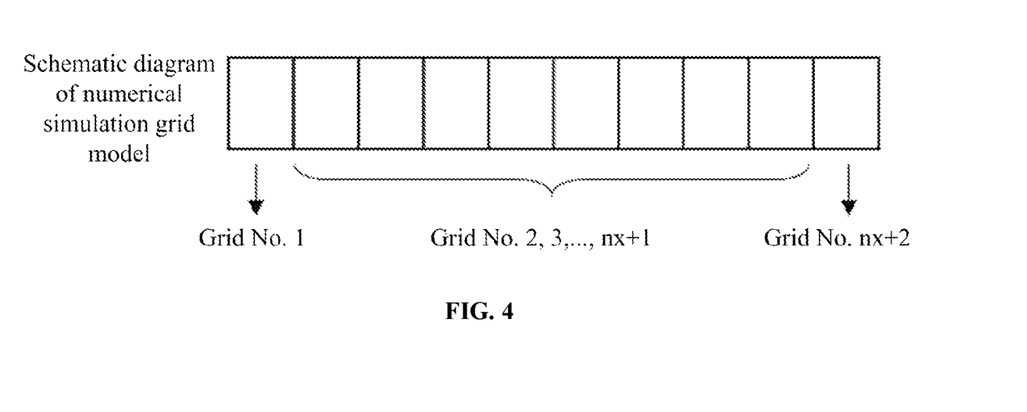
FIG. 4 is a numbering diagram of a one-dimensional numerical simulation grid model of the present disclosure.

The grid numbering in the one-dimensional numerical simulation grid model is shown in FIG. 4.

Step 103 specifically includes the following sub-steps.

A number of grids on an x-axis of the one-dimensional numerical simulation grid model is determined according to a length of the cylindrical core. A number of grids on a y-axis and a z-axis of the one-dimensional numerical simulation grid model is 1. The grid on the x-axis is expressed as nx=L/dx+2, where L represents the length of the cylindrical core, dx is a length of each grid in an x-axis direction, and dx is not greater than 1 cm. Specifically, it includes establishing a one-dimensional component numerical model (one-dimensional numerical simulation grid model) in the Cartesian coordinate system (the grid numbers in x, y and z directions are nx, 1 and 1 respectively) using numerical simulation software (such as CMG numerical simulation software and Eclipse).

A length of a grid of the one-dimensional numerical simulation grid model in a y-axis direction and a z-axis direction is determined according to a diameter of the cylindrical core, where $dy=dz=\sqrt{0.25\pi D^2}$, dy is a length of each grid in the y-axis direction, dz is a length of each grid in the z-axis direction, and D is the diameter of the cylindrical core.

A temperature of the to-be-tested reservoir is taken as a simulated ambient temperature of the one-dimensional numerical simulation grid model.

The formation pressure of the to-be-tested reservoir is taken as an initial simulated environmental pressure of the one-dimensional numerical simulation grid model.

The cylindrical core is placed in an overburden pressure pore permeability instrument to measure a porosity and gas permeability under different pore pressure conditions. An experimental temperature of the overburden pressure pore permeability instrument is set to the temperature of the to-be-tested reservoir, an experimental confining pressure of the overburden pressure pore permeability instrument is set to be higher than the formation pressure of the to-be-tested reservoir, and there is no gas leakage during the experiment. The measurement by the overburden pressure pore permeability instrument specifically includes: according to the standards of SY-T 6385-1999 The porosity and permeability measurement of core in net confining stress, the porosity $\Phi$ and gas permeability k under different pore pressure conditions are measured, and the number of pore pressure measurement points is not less than 4. For example, different pore pressures include 0.3×P, 0.5×P, 0.7×P and 1.0×P. The porosity and permeability under the pore pressures of 0.3×P, 0.5×P, 0.7×P and 1.0×P are measured. In step 102, the initially set confining pressure under which the cylindrical core is loaded into the core holder is the experimental confining pressure of the overburden pressure pore permeability instrument.

During the simulation experiment, the back pressure is gradually reduced, that is, the pore pressure is gradually reduced, so the permeability changes in real time when the pore pressure changes. Therefore, it is necessary to measure the permeability under different pressure conditions and input the curve of the permeability changing with the pressure into the simulator.

The porosity and gas permeability measured in the overburden pressure pore permeability instrument under different pore pressure conditions are taken as a porosity and gas permeability of central grids of the one-dimensional numerical simulation grid model. The central grids (the grids numbered 2 to nx+1 in FIG. 3) are other grids after removing one grid at both ends of the one-dimensional numerical simulation grid model in the x-axis direction.

For the central grids: an initialized first oil phase relative permeability curve and first gas phase relative permeability curve are set as straight lines, and oil saturation is taken as an abscissa and an oil phase relative permeability and a gas phase relative permeability are taken as ordinates. The first oil phase relative permeability curve crosses ($S_{or}$, 0) and (1,1), the first gas phase relative permeability curve crosses ($S_{or}$, 1) and (1, 0), and a calculation method of $S_{or}$ is $$sor = 1 - \frac{V_{po}}{0.25\pi D^2 L \phi_0},$$

where $V_{po}$ is the cumulative oil production experimental value, and $\phi_0$ is a porosity when the pore pressure measured in the overburden pressure pore permeability instrument is the formation pressure of the to-be-tested reservoir.

For a first endpoint grid (a grid numbered 1 in FIG. 3) and a second endpoint grid (a grid numbered nx+2 in FIG. 3): V1/(dx·dy·dz) is taken as a porosity of the first endpoint grid and V2/(dx·dy·dz) is taken as a porosity of the second endpoint grid. The first endpoint grid is a grid at a left end of the one-dimensional numerical simulation grid model in the x-axis direction. The second endpoint grid is a grid at a right end of the one-dimensional numerical simulation grid model in the x-axis direction. V1 represents a void volume between the valve and a left end face of the cylindrical core, V2 represents a void volume between the back pressure valve and a right end face of the cylindrical core, an initialized second oil phase relative permeability curve and second gas phase relative permeability curve are set as straight lines, and oil saturation is taken as an abscissa and an oil phase relative permeability and a gas phase relative permeability are taken as ordinates. The second oil phase relative permeability curve crosses (0, 0) and (1,1), and the second gas phase relative permeability curve crosses (0, 1) and (1, 0). The gas permeability of the first endpoint grid and the second endpoint grid is not less than 1,000 mD.

Figure 5:
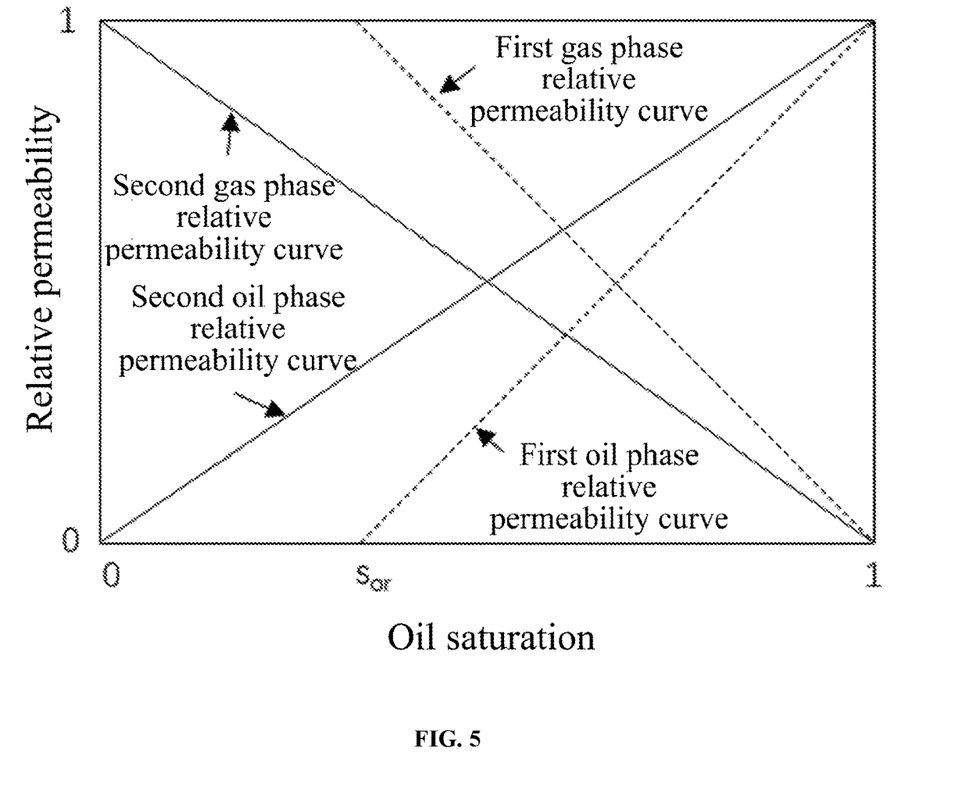
FIG. 5 is a schematic diagram of an initialized oil phase relative permeability curve and gas phase relative permeability curve of the one-dimensional numerical simulation grid model of the present disclosure.

The first oil phase relative permeability curve, the first gas phase relative permeability curve, the second oil phase relative permeability curve and the second gas phase relative permeability curve are shown in FIG. 5.

The fluid components used in equivalent simulation with the one-dimensional numerical simulation grid model are consistent with the to-be-tested crude oil and to-be-tested gas in the physical model experiment.

According to the standards of GB/T 26981-2020 Analysis method for reservoir fluid physical properties, the viscosity, density and volume coefficient of the to-be-tested crude oil under different pressure conditions are measured.

The to-be-tested gas and the to-be-tested crude oil are fully mixed at a volume ratio of 1:9. According to the standards of GB/T 26981-2020 Analysis method for reservoir fluid physical properties, the constant-mass expansion experiment and constant volume depletion experiment of the oil and gas mixture are carried out to obtain the viscosity, density and volume coefficient of the oil and gas mixture under different pressure conditions.

The volume ratio of the to-be-tested crude oil and the to-be-tested gas is gradually increased (for example, 2:8, 3:7, 4:6 . . . ), and the to-be-tested gas and the to-be-tested crude oil are fully mixed. The steps are repeated, and the viscosity, density and volume coefficient under different oil and gas mixing ratios and different pressure conditions are measured.

The fluid physical parameters of each component are obtained by fitting the experimental test data of fluid viscosity, density and volume coefficient in the above steps with phase-fitting software (such as PVTi and Winprop).

A simulation well is set in the second endpoint grid. A wellbore diameter of the simulation well is the same as an inner diameter of a tubing on a left side of the back pressure valve, and the left side of the back pressure valve is a side of the back pressure valve connected with the second pressure gauge.

Step 104: Developing performance of a producing well of the to-be-tested reservoir is equivalently simulated using the one-dimensional numerical simulation grid model based on a current oil phase relative permeability curve and a current gas phase relative permeability curve, so as to obtain simulation values at different times. The simulation values include an upstream pressure simulation value, a cumulative gas production simulation value and a cumulative oil production simulation value.

Step 104 specifically includes the following sub-steps.

The developing performance of the producing well of the to-be-tested reservoir is equivalently simulated using a component numerical simulator, so as to obtain the simulation values at different times.

The component numerical simulator includes GEM numerical simulation software and Eclipse E300 numerical simulation software.

Step 105: An objective function is constructed according to the experimental and simulation values.

Step 106: Whether a value of the objective function is less than or equal to a preset target value is determined.

The objective function is expressed as:

$$f = \frac{1}{3}\left[\frac{\sum_{i=1}^{N}(C_{gs}^i - C_{ge}^i)^2}{\sum_{i=1}^{N}(C_{ge}^i - C_{ge}^{avg})^2} + \frac{\sum_{i=1}^{N}(C_{os}^i - C_{oe}^i)^2}{\sum_{i=1}^{N}(C_{oe}^i - C_{oe}^{avg})^2} + \frac{\sum_{i=1}^{N}(P_{Gs}^i - P_{Ge}^i)^2}{\sum_{i=1}^{N}(P_{Ge}^i - P_{Ge}^{avg})^2}\right],$$

where $f$ represents the value of the objective function, N represents a number of simulation values, $C_{gs}^i$ represents an i-th cumulative gas production simulation value, $C_{ge}^i$ represents an i-th cumulative gas production experimental value, $C_{ge}^{avg}$ represents an average of N-th cumulative gas production experimental values, $C_{os}^i$ represents an i-th cumulative oil production simulation value, $C_{oe}^i$ represents an i-th cumulative oil production experimental value, $C_{oe}^{avg}$ represents an average of N-th cumulative oil production experimental values, $P_{Gs}{}^i$ represents a pressure of an i-th first pressure gauge, and $P_{Ge}{}^i$ represents a pressure of an i-th first endpoint grid.

Step 107: If the value of the objective function is not less than or equal to the preset target value, the oil phase relative permeability curve and the gas phase relative permeability curve of the one-dimensional numerical simulation grid model are adjusted, and the method returns to the step of "equivalently simulating developing performance of a producing well of the to-be-tested reservoir using the one-dimensional numerical simulation grid model based on a current oil phase relative permeability curve and a current gas phase relative permeability curve, so as to obtain simulation values at different times". When the oil phase relative permeability curve and the gas phase relative permeability curve of the one-dimensional numerical simulation grid model are adjusted, the residual oil saturation ($S_{or}$) is kept unchanged.

The residual oil saturation is the minimum oil saturation of the first oil phase relative permeability curve and the first gas phase relative permeability curve.

Figure 6:
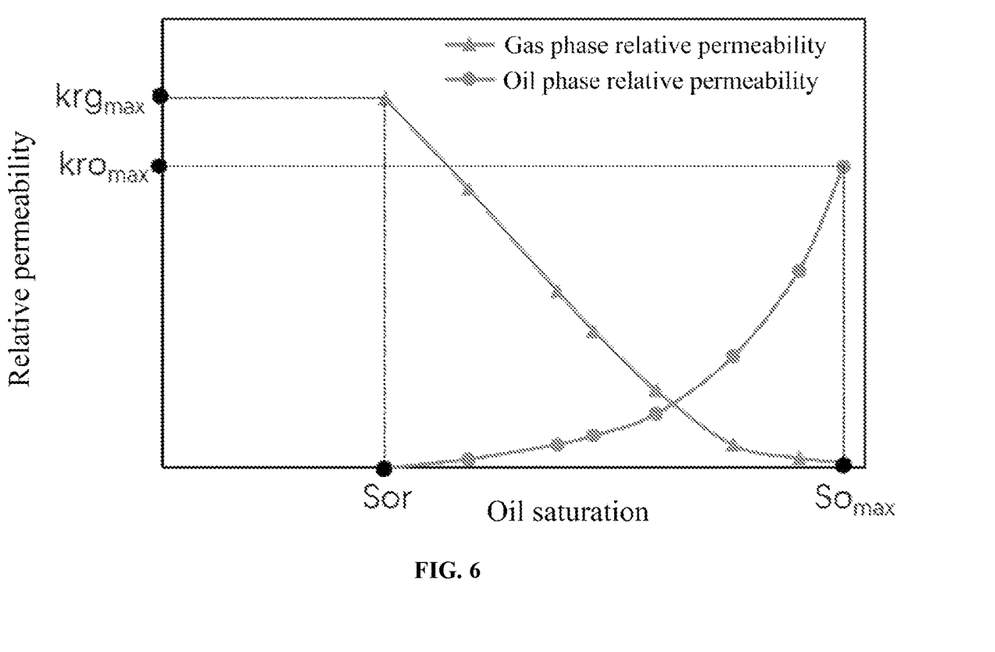
FIG. 6 is a schematic diagram illustrating characteristics of an oil phase relative permeability curve and a gas phase relative permeability curve of the present disclosure.

In step 107, a process of adjusting the oil phase relative permeability curve and the gas phase relative permeability curve of the one-dimensional numerical simulation grid model specifically includes: when the first oil phase relative permeability curve and the first gas phase relative permeability curve of the one-dimensional numerical simulation grid model are adjusted, the residual oil saturation is kept unchanged. The oil production, gas production and pressure of the first endpoint grid obtained by simulation are compared with the oil production, gas production and first pressure obtained by experimental testing respectively, and the morphology and characteristic points of the relative permeability curves are adjusted according to the differences between the simulation and experimental values (specific characteristic points are shown in FIG. 6). Specific adjustment methods include the following steps.

1) The pressure of the first endpoint grid obtained by simulation is compared with the first pressure obtained by experimental testing.

If the simulation value (the pressure of the first endpoint grid) is higher than the experimental value (the first pressure), $kro_{max}$ is reduced by a first set value, $krg_{max}$ is reduced by a second set value, or $So_{max}$ is increased by a third set value. $krg_{max}$ represents a maximum permeability (ordinate) of the first gas phase relative permeability curve, $kro_{max}$ represents a maximum permeability (ordinate) of the first oil phase relative permeability curve, and $So_{max}$ represents maximum oil saturation (abscissa) of the first oil phase relative permeability curve.

If the simulation value is lower than the experimental value, $kro_{max}$ is increased by a first set value, $krg_{max}$ is increased by a second set value, or $So_{max}$ is reduced by a third set value.

2) The oil production obtained by simulation is compared with the oil production obtained by experimental testing. If the simulation value is always higher than the experimental value (consecutive setting times), the relative permeability corresponding to each saturation on the first oil phase relative permeability curve is increased. If the simulation value is always lower than the experimental value, the relative permeability corresponding to each saturation on the first oil phase relative permeability is reduced. If the initial oil production obtained by simulation is higher than the experimental value, but the later oil production is lower than the experimental value, the relative permeability of the first oil phase relative permeability curve in the low oil saturation interval is increased, and the relative permeability of the first oil phase relative permeability curve in the high oil saturation interval is reduced. If the initial oil production obtained by simulation is lower than the experimental value, but the later oil production is higher than the experimental value, the relative permeability of the first oil phase relative permeability curve in the low oil saturation interval is reduced, and the relative permeability of the first oil phase relative permeability curve in the high oil saturation interval is increased (The low oil saturation or high oil saturation mentioned here is a relative concept, and the specific ranges of different experiments are different, which needs to be calculated according to the difference between simulation and experiment).

3) The gas production obtained by simulation is compared with the gas production obtained by experimental testing. If the simulation value is always higher than the experimental value, the relative permeability corresponding to each saturation on the first gas phase relative permeability curve is increased. If the simulation value is always lower than the experimental value, the relative permeability corresponding to each saturation on the first gas phase relative permeability is reduced. If the initial gas production obtained by simulation is higher than the experimental value, but the later gas production is lower than the experimental value, the relative permeability of the first gas phase relative permeability curve in the low oil saturation interval is increased, and the relative permeability of the first gas phase relative permeability curve in the high oil saturation interval is reduced. If the initial gas production obtained by simulation is lower than the experimental value, but the later gas production is higher than the experimental value, the relative permeability of the first gas phase relative permeability curve in the low oil saturation interval is reduced, and the relative permeability of the first gas phase relative permeability curve in the high oil saturation interval is increased.

4) In the process of adjusting the relative permeability curve, it needs to be ensured that it conforms to its own physical significance, including: the oil phase relative permeability increases monotonically with the oil saturation, the gas phase relative permeability decreases monotonically with the oil saturation, and the range of key characteristic parameters is $S_{or} < So_{max} \leq 1$, $0 < kro_{max} \leq 1$, and $0 < krg_{max} \leq 1$.

5) Steps 1), 2), and 3) only list the methods of how to adjust some typical phenomena. However, in the actual application process, the trend of the simulation value and the experimental value may be more complicated. In the adjustment process, the relative permeability curve shall be adjusted repeatedly according to the principles determined in the above steps, so as to gradually reduce the value of the objective function.

Step 108: If the value of the objective function is less than or equal to the preset target value, the current oil phase relative permeability curve and the current gas phase relative permeability curve are output.

According to the oil phase relative permeability curve and the gas phase relative permeability curve output in step 108, the oil phase relative permeability and the gas phase relative permeability from the to-be-tested reservoir are determined.

Compared with the steady-state method and unsteady-state method for measuring the oil and gas relative permeability mainly used in the prior art, the present disclosure reduces the measurement time, cost and error, and can quickly, economically and accurately determine the oil and gas relative permeability of tight reservoirs.

Each embodiment of the present specification is described in a progressive manner, each embodiment focuses on the difference from other embodiments, and the same and similar parts between the embodiments may refer to each other.

Specific examples are used herein to explain the principles and embodiments of the present disclosure. The foregoing description of the embodiments is merely intended to help understand the method of the present disclosure and its core ideas; besides, various modifications may be made by those of ordinary skill in the art to specific embodiments and the scope of application in accordance with the ideas of the present disclosure. In conclusion, the content of the present specification shall not be construed as limitations to the present disclosure.

What is claimed is:

1. A method for determining oil and gas relative permeabilities of a reservoir, using a relative permeability testing device, wherein the relative permeability testing device comprises a piston container, a valve, a first pressure gauge, a core holder, a second pressure gauge, a back pressure valve and a back pressure pump that are connected in sequence; the relative permeability testing device further comprises a confining pressure pump, an oil and gas separator, a gas flowmeter and a balance; and the confining pressure pump is configured to provide a confining pressure for the core holder, the oil and gas separator is connected with the back pressure valve, and both the gas flowmeter and the balance are connected with the oil and gas separator; and the method for determining oil and gas relative permeabilities of a reservoir comprises:

drilling a cylindrical core from a to-be-tested reservoir;

injecting an oil and gas mixture with a volume ratio of oil to gas of 1 into the cylindrical core through the piston container at a set flow rate by using the relative permeability testing device, and reducing pressures at a control end of the back pressure valve in sequence to obtain experimental values acquired under each pressure at the control end of the back pressure valve at a set time interval, wherein the experimental values comprise an upstream pressure, a downstream pressure, a cumulative gas production experimental value and a cumulative oil production experimental value; the upstream pressure represents a pressure of the first pressure gauge, the downstream pressure represents a pressure of the second pressure gauge, the cumulative gas production experimental value is obtained by the gas flowmeter, and the cumulative oil production experimental value is obtained by the balance; and the oil and gas mixture is a mixture of to-be-tested gas and to-be-tested crude oil;

constructing a one-dimensional numerical simulation grid model according to the cylindrical core; and initializing an oil phase relative permeability curve and a gas phase relative permeability curve of the one-dimensional numerical simulation grid model;

equivalently simulating developing performance of a producing well of the to-be-tested reservoir using the one-dimensional numerical simulation grid model based on a current oil phase relative permeability curve and a current gas phase relative permeability curve, so as to obtain simulation values at different times, wherein the simulation values comprise an upstream pressure simulation value, a cumulative gas production simulation value and a cumulative oil production simulation value;

constructing an objective function according to the experimental and simulation values;

determining whether a value of the objective function is less than or equal to a preset target value;

if not, adjusting the oil phase relative permeability curve and the gas phase relative permeability curve of the one-dimensional numerical simulation grid model, and returning to the step of "equivalently simulating developing performance of a producing well of the to-be-tested reservoir using the one-dimensional numerical simulation grid model based on a current oil phase relative permeability curve and a current gas phase relative permeability curve, so as to obtain simulation values at different times"; and if yes, outputting the current oil phase relative permeability curve and the current gas phase relative permeability curve;

wherein the objective function is expressed as:

$$f = \frac{1}{3}\left[\frac{\sum_{i=1}^{N}(C_{gs}^i - C_{ge}^i)^2}{\sum_{i=1}^{N}(C_{ge}^i - C_{ge}^{avg})^2} + \frac{\sum_{i=1}^{N}(C_{os}^i - C_{oe}^i)^2}{\sum_{i=1}^{N}(C_{oe}^i - C_{oe}^{avg})^2} + \frac{\sum_{i=1}^{N}(P_{Gs}^i - P_{Ge}^i)^2}{\sum_{i=1}^{N}(P_{Ge}^i - P_{Ge}^{avg})^2}\right],$$

wherein $f$ represents the value of the objective function, N represents a number of simulation values, $C_{gs}^i$ gs represents an i-th cumulative gas production simulation value, $C_{ge}^i$ represents an i-th cumulative gas production experimental value, $C_{ge}^{avg}$ represents an average of N-th cumulative gas production experimental values, $C_{os}^i$ represents an i-th cumulative oil production simulation value, $C_{oe}^i$ represents an i-th cumulative oil production experimental value, $C_{oe}^{avg}$ represents an average of N-th cumulative oil production experimental values, $P_{Gs}^i$ represents a pressure of an i-th first pressure gauge, and $P_{Ge}^i$ represents a pressure of an i-th first endpoint grid.

2. The method for determining oil and gas relative permeabilities of a reservoir according to claim 1, wherein a process of injecting an oil and gas mixture with a volume ratio of oil to gas of 1 into the cylindrical core through the piston container at a set flow rate by using the relative permeability testing device, and reducing pressures at a control end of the back pressure valve in sequence to obtain experimental values acquired under each pressure at the control end of the back pressure valve at a set time interval specifically comprises: loading the cylindrical core into the core holder, injecting the oil and gas mixture with a volume ratio of oil to gas of 1 into the cylindrical core through the piston container at the set flow rate, closing the valve when an oil and gas output speed of the core holder changes within a set change range within a set time period, and closing the back pressure valve when a difference between the first pressure gauge and the second pressure gauge is less than a set pressure value; initializing the pressure at the control end of the back pressure valve to 0.9×P, wherein P is a formation pressure of the to-be-tested reservoir;

opening the back pressure valve, recording the upstream pressure, the downstream pressure, the cumulative gas production experimental value and the cumulative oil production experimental value according to a set frequency, and closing the back pressure valve until the oil and gas separator no longer produces gas;

subtracting a set control pressure from a current pressure at the control end of the back pressure valve to obtain an updated pressure at the control end of the back pressure valve; determining whether the updated pressure at the control end of the back pressure valve is less than a set minimum control pressure; and if not, returning to the step of "opening the back pressure valve, recording the upstream pressure, the downstream pressure, the cumulative gas production experimental value and the cumulative oil production experimental value according to a set frequency, and closing the back pressure valve until the oil and gas separator no longer produces gas".

3. The method for determining oil and gas relative permeabilities of a reservoir according to claim 2, wherein the pressures at the control end of the back pressure valve reduced in sequence specifically comprise 0.8×P, 0.7×P, 0.6×P, 0.5×P, 0.4×P, 0.3×P, 0.2×P and 0.1×P.

4. The method for determining oil and gas relative permeabilities of a reservoir according to claim 2, wherein a process of constructing a one-dimensional numerical simulation grid model according to the cylindrical core, and initializing an oil phase relative permeability curve and a gas phase relative permeability curve of the one-dimensional numerical simulation grid model specifically comprises:

determining a number of grids on an x-axis of the one-dimensional numerical simulation grid model according to a length of the cylindrical core, wherein a number of grids on a y-axis and a z-axis of the one-dimensional numerical simulation grid model is 1; and the grid on the x-axis is expressed as nx=L/dx+2, wherein L represents the length of the cylindrical core, dx is a length of each grid in an x-axis direction, and dx is not greater than 1 cm;

determining a length of a grid of the one-dimensional numerical simulation grid model in a y-axis direction and a z-axis direction according to a diameter of the cylindrical core, wherein dy=dz=√0.25πD², dy is a length of each grid in the y-axis direction, dz is a length of each grid in the z-axis direction, and D is the diameter of the cylindrical core;

taking a temperature of the to-be-tested reservoir as a simulated ambient temperature of the one-dimensional numerical simulation grid model;

taking the formation pressure of the to-be-tested reservoir as an initial simulated environmental pressure of the one-dimensional numerical simulation grid model;

placing the cylindrical core in an overburden pressure pore permeability instrument to measure a porosity and gas permeability under different pore pressure conditions, wherein an experimental temperature of the overburden pressure pore permeability instrument is set to the temperature of the to-be-tested reservoir, and an experimental confining pressure of the overburden pressure pore permeability instrument is set to be higher than the formation pressure of the to-be-tested reservoir;

taking the porosity and gas permeability measured in the overburden pressure pore permeability instrument under different pore pressure conditions as a porosity and gas permeability of central grids of the one-dimensional numerical simulation grid model, wherein the central grids are other grids after removing one grid at both ends of the one-dimensional numerical simulation grid model in the x-axis direction;

for the central grids: setting an initialized first oil phase relative permeability curve and first gas phase relative permeability curve as straight lines, and taking oil saturation as an abscissa and an oil phase relative permeability and a gas phase relative permeability as ordinates, wherein the first oil phase relative permeability curve crosses ($S_{or}$, 0) and (1,1), the first gas phase relative permeability curve crosses ($S_{or}$, 1) and (1, 0), and a calculation method of $S_{or}$ is $$sor = 1 - \frac{V_{po}}{0.25\pi D^2 L \phi_0},$$

wherein $V_{po}$ is the cumulative oil production experimental value, and $\phi_0$ is a porosity when the pore pressure measured in the overburden pressure pore permeability instrument is the formation pressure of the to-be-tested reservoir; for a first endpoint grid and a second endpoint grid: taking V1/(dx·dy·dz) as a porosity of the first endpoint grid and V2/(dx·dy·dz) as a porosity of the second endpoint grid, wherein the first endpoint grid is a grid at a left end of the one-dimensional numerical simulation grid model in the x-axis direction, the second endpoint grid is a grid at a right end of the one-dimensional numerical simulation grid model in the x-axis direction, V1 represents a void volume between the valve and a left end face of the cylindrical core, V2 represents a void volume between the back pressure valve and a right end face of the cylindrical core, an initialized second oil phase relative permeability curve and second gas phase relative permeability curve are set as straight lines, and oil saturation is taken as an abscissa and an oil phase relative permeability and a gas phase relative permeability are taken as ordinates, wherein the second oil phase relative permeability curve crosses (0, 0) and (1,1), and the second gas phase relative permeability curve crosses (0, 1) and (1, 0); and setting a simulation well in the second endpoint grid, wherein a wellbore diameter of the simulation well is the same as an inner diameter of a tubing on a left side of the back pressure valve, and the left side of the back pressure valve is a side of the back pressure valve connected with the second pressure gauge.

5. The method for determining oil and gas relative permeabilities of a reservoir according to claim 1, wherein a process of equivalently simulating developing performance of a producing well of the to-be-tested reservoir using the one-dimensional numerical simulation grid model based on a current oil phase relative permeability curve and a current gas phase relative permeability curve, so as to obtain simulation values at different times, wherein the simulation values comprise an upstream pressure simulation value, a cumulative gas production simulation value and a cumulative oil production simulation value specifically comprises: equivalently simulating the developing performance of the producing well of the to-be-tested reservoir using a component numerical simulator, so as to obtain the simulation values at different times.

6. The method for determining oil and gas relative permeabilities of a reservoir according to claim 5, wherein the component numerical simulator comprises GEM numerical simulation software and Eclipse E300 numerical simulation software.

7. The method for determining oil and gas relative permeabilities of a reservoir according to claim 1, wherein a length of the cylindrical core is greater than or equal to 1.5 times a diameter of the cylindrical core.

8. The method for determining oil and gas relative permeabilities of a reservoir according to claim 1, wherein the relative permeability testing device further comprises a constant pressure and constant speed pump connected to one end of the piston container, and the other end of the piston container is connected to the valve.

* * * * *